2 Sheets—Sheet 1.

F. McDUFFEE,

Assignor, by mesne assignments, to J. L. HALL.

Time-Lock.

No. 9,246. Reissued June 8, 1880.

*Witnesses:*

Donn J. Twitchell.

Lancy P. Hollingsworth

*Inventor:*

F. McDuffee.

By his Attys.

Dodge & Son.

F. McDUFFEE,

Assignor, by mesne assignments, to J. L. HALL.

Time-Lock.

No. 9,246. Reissued June 8, 1880.

Witnesses:

Lonn P. Turtchull.

Sidney P. Hollingsworth

Inventor:

F. McDuffee.

By his Attys.

Dodgerson.

UNITED STATES PATENT OFFICE.

FRANKLIN McDUFFEE, OF ROCHESTER, NEW HAMPSHIRE, ASSIGNOR, BY MESNE ASSIGNMENT, TO JOSEPH L. HALL, OF CINCINNATI, OHIO.

TIME-LOCK.

SPECIFICATION forming part of Reissued Letters Patent No. 9,246, dated June 8, 1880.

Original No. 178,940, dated June 20,1876. Application for reissue filed April 14, 1880.

*To all whom it may concern:*

Be it known that I, FRANKLIN McDUFFEE, of Rochester, in the county of Strafford and State of New Hampshire, have invented certain new and useful Improvements in Chronometer and Combination Locks; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to locks for use on safes, vaults, and similar receptacles for valuables; and the invention consists in so combining two or more sets of tumblers that they can all be operated direct by one spindle, and in providing each set with a separate latch or angle bar.

It further consists in so combining one set of the tumblers with the time attachment that by means of said tumblers the time attachment can be disconnected from the main lock whenever desired; and it further consists in so combining a main lock, a dogging device for preventing said lock from being operated or opened, and an extra set of tumblers that by means of said tumblers the lock may be released from the operation of said dogging device whenever desired; and, finally, it further consists in an arrangement of parts whereby the combination on which one set of tumblers are set can be changed, all as hereinafter more fully set forth.

Figure 1:
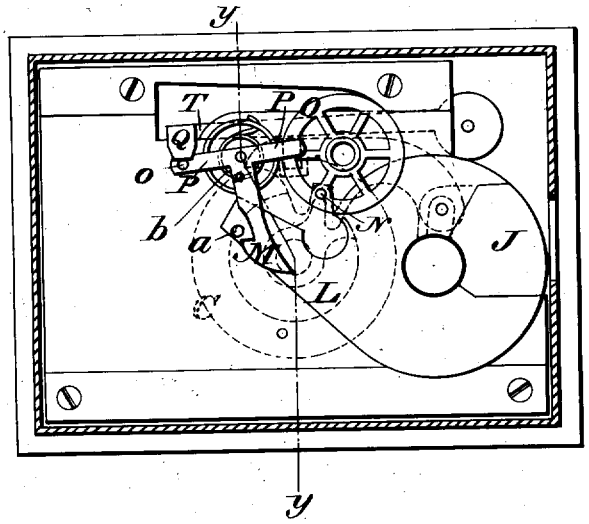
Figure 2:
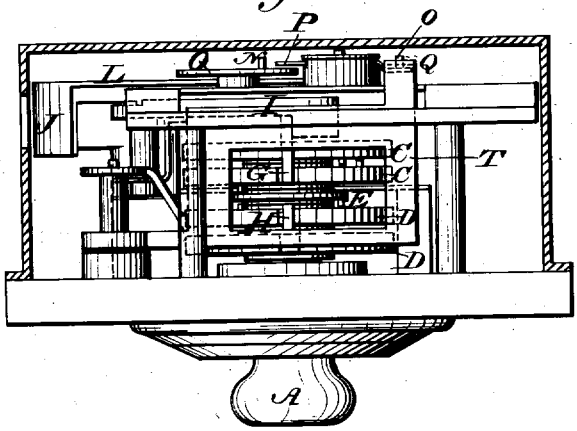
Figure 3:
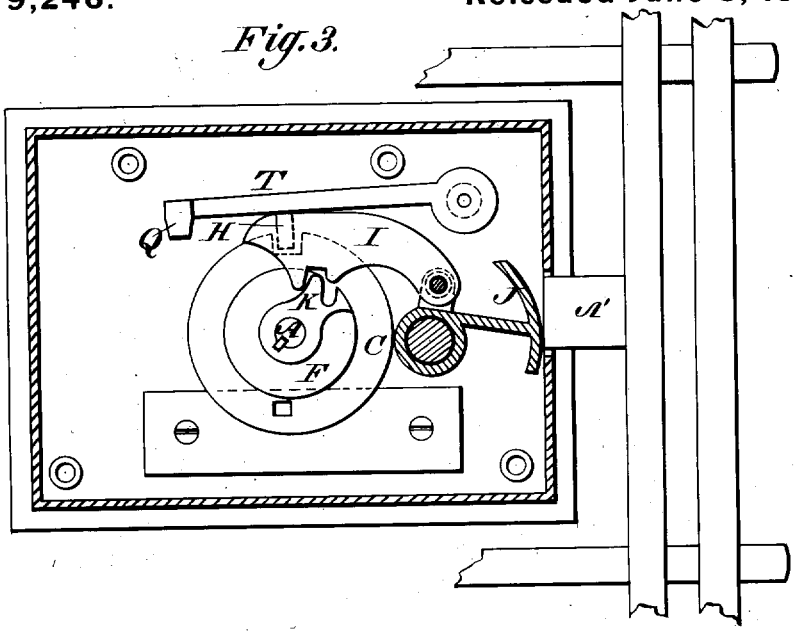
Figure 4:
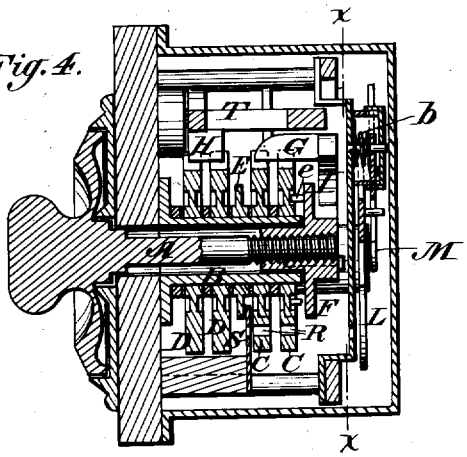
Figure 5:
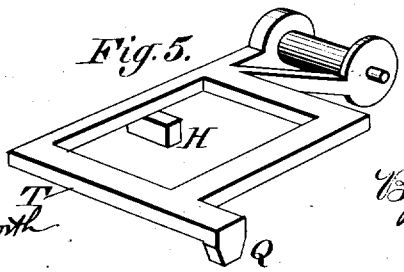

Figure 1 is a front elevation of a lock containing my improvements, with the face-plate of the case removed. Fig. 2 is a top-plan view, with the case shown in section. Fig. 3 is a longitudinal vertical section on the line *x x* of Fig. 4. Fig. 4 is a transverse vertical section on the line *y y* of Fig. 1, and Fig. 5 is a perspective view of one of the angle-bars detached.

The object of the improvement as applied to chronometer-locks is to prevent the possibility of being accidentally locked out, and also to obviate the necessity of using two sets of time-movements, and enable the lock to be opened in advance of the time set, if necessary.

As applied to ordinary combination-locks, the object is to have double combinations which one person alone cannot operate, so that the lock cannot be opened without the assembling of the different parties having separately a knowledge of the different combinations of the several sets of tumblers, thereby making it necessary for burglars who attempt to force officers to unlock for them to assemble too many persons for safety; and, further, the object of the improvement is to enable the parties having rightful control of the lock to open it at any time in case of an emergency—as, for instance, an approaching fire.

In the present instance I have shown the invention as applied to that style of lock in which a pivoted bolt is used; but it is obvious that it can be applied to locks having a sliding bolt with equal advantage, if desired.

As represented in the drawings, I provide two sets of tumblers, C and D, which are mounted loosely upon a fixed tube, B, as shown in Fig. 4. The spindle A extends through this tube, and has a disk, F, rigidly secured to its inner end, this disk F being provided with a pin, *e*, which, as the spindle is turned, strikes against a similar pin projecting from the face of the adjoining tumbler, and which in like manner communicates motion to the next tumbler, and so on throughout the series of tumblers C which compose the first set. Between the two sets of tumblers is a disk, E, as shown in Figs. 2 and 4, and which is provided with pins *e*, the same as the tumblers, so that after the first set of tumblers C have been made to engage with each other by turning the spindle they in turn will impart motion to this disk E, and it in turn will engage with the adjoining tumbler of the set D, and thus motion is imparted to both sets of tumblers by simply turning the spindle A, the operation being the same in this respect as though the two sets of tumblers and the intermediate disk, E, all composed a single set of tumblers.

For each set of tumblers I provide a separate latch or angle bar, as shown in Fig. 4, the bar T (shown detached in Fig. 5) having its fence H arranged to operate in connection with the tumblers D, and the bar I, with its fence G, being arranged to operate in connection with the tumblers C, the bar I in this case being connected to the pivoted bolt J of the lock, as shown in Fig 3, and being arranged to engage with a hook, K, on the spindle, by which means the bolt J of the lock is moved, as in ordinary combination-locks.

As shown in Figs. 4 and 5, the bar T is made wide enough to project laterally over the bar I, so that it will be held up and its fence H be prevented from engaging in the notches of its tumblers D until after the tumblers C have been set up, so that the fence G of the bar I can fall into the notches of the tumblers C, and then as the bar I falls the bar T is also permitted to fall and engage with its tumblers D, they having been previously set up for that purpose.

The bar T is provided at its free end with a projection, Q, arranged to project far enough to engage with or strike upon a pin, P, in one of the arms of the hook or dogging device M, which is arranged to dog or lock the bolt J fast, as shown in Figs. 1 and 2, the bolt J being provided with a rearwardly-extending arm, L, in which is a pin, *a*, for the hook M to engage with.

As shown in Figs, 1, 2, and 4, the hook M is pivoted just above the rear end of the arm L of the bolt J, and has a spring, *b*. applied to it in such a manner as to cause it to engage automatically with the pin of the arm L whenever the bolt J is moved into the position it occupies when the door is closed and locked, which position is shown in Fig. 1. At its upper end this hook or dogging device M is provided with an arm, P, projecting laterally on each side thereof, as shown in Fig. 1, so arranged that the projection Q of the angle-bar T will depress the arm on that side, and thus disengage the hook M from the arm L of the bolt by swinging it away from the pin *a*, thus leaving the lock free to be opened by setting up the tumblers C and operating the spindle in the usual manner. This is the manner in which the invention is shown applied to an ordinary combination-lock.

When it is to be applied to a chronometer-lock, or one in which a time attachment is used, it is only necessary to so arrange the time mechanism that its operating-wheel O shall be in a position to operate on the opposite arm of the hook M, as shown in Figs. 1 and 2, this wheel being provided with a pin, N, which, as the wheel rotates, strikes against the under side of the arm, and thereby disengages the hook M from the arm L of the lock-bolt.

In case the time-movement should stop prematurely, or before it has operated to release the lock-bolt from the dogging operation of the hook M, or in case it should be desired to open the door before the time for which the time mechanism has been set, it is only necessary to first set up the tumblers D and then the tumblers C, when the angle-bar T will fall, and, striking the arm of the hook M, will disconnect it from the lock-bolt, after which the bolt J can be moved by turning the spindle A in the usual manner, thus enabling the door to be opened. In case it has been thus opened when the time-movement has not been stopped, the door can be closed and locked in the usual manner, and as soon as the angle-bar T is raised from the arm on which it rests the hook M will automatically engage with the arm L of the lock-bolt J, thus restoring all the parts to the position they were in before the door was opened, and after which the time-movement will operate to release the lock-bolt at the time originally set, the same as though the door had not been opened in the meantime.

It will thus be seen that the extra set of tumblers D may be applied to a chronometer-lock in such a manner as to enable the person having control of the combination on which said tumblers are set to disconnect the time attachment from the main lock at any time desired, and that by this means not only is the difficulty arising from a lock-out caused by an accidental or premature stoppage of the time-movement obviated, but that the door can be opened at any time desired by getting together the different persons having the several combinations on which the several sets of tumblers are set. It also avoids the necessity of using two time-movements, (which when used are not absolute proof against an accidental stoppage,) as in case the movement does stop it affords a means of disconnecting the time attachment and opening the door. It will also be seen that it can be used equally well without the time-movement by applying the dogging device or hook M to an ordinary combination-lock, and then using the extra set of tumblers and their angle-bar to disconnect said dogging device from the lock-bolt.

It will, of course, be understood that in all cases the combination on which the different sets of tumblers are set will be intrusted to different parties, so that neither alone can open the lock without the presence and assistance of the other. Thus the president of a bank might have control of the tumblers D and the cashier have control of the other set of tumblers, C.

While but two sets of tumblers are shown, it is obvious that more may be used if desired.

In order to change the combination on which the tumblers C are set, there is a square hole, R, made through the outer rim of said tumblers, as shown in Fig. 4, and there is a stationary plate, S, arranged between them and the disk E, with a corresponding hole in it, so that when a key is inserted through these holes R and turned partially around to loosen the rims of the tumblers on their disks or hubs, (they being fastened in a manner well known to lock-makers,) the end of the key can be held in the plate S, which will thus hold the rims stationary, while by turning the spindle the hubs or central portion of the tumblers can be turned as far as desired, thereby changing the combination at will.

In Fig. 3 the lock-bolt and the bolt-work of the door are represented in the locked position, the bolt J closing the opening in the front end of the case, through which the tongue or stump A′ of the bolt-work enters when the door-bolts are retracted; and Fig. 1 shows the lock-bolt in the same position, the hook M being detached from the lock-bolt by means of the angle-bar T, and as it would be by the wheel O of the time-movement whenever the latter had run long enough to bring the pin N against the arm P on that side.

The advantages of these improvements will be readily understood by persons familiar with such matters. For instance, suppose the president and cashier of a bank are the persons entrusted with the combinations, the former having the combination for the tumblers D and the latter having that for the tumblers C. The cashier can set his part of the lock without the presence of the president, and he can always unlock it at such time as the time-movement will permit, but at no other time. He cannot be compelled to open it, as it is impossible for him to open it alone until the hour for which the time-movement is set arrives. But should the time mechanism stop, or should it be necessary to open the safe or door at any unusual time, the cashier has only to summon the president, who, using his combination in conjunction with that of the cashier, can open the lock; but neither can do it alone.

As an improvement upon the common combination-locks, taking out all the time mechanism, but leaving the hook M and the pin which secures the lock-bolt, a lock is produced which the cashier can never open alone, as he locks himself out by means of the hook whenever he locks the door, and he cannot unlock it until the arrival of the party who controls the other combination. He therefore cannot be compelled by burglars to unlock it, nor can the president alone be compelled to do so.

While but two sets of tumblers are shown, it is obvious that more may be used, thereby increasing the number of persons necessary to be present in order to open the lock or the door.

While I have shown my improvements as applied to a lock having a pivoted bolt, it is obvious that they may be applied to locks which have a sliding bolt with equal advantage; and from the description and illustration given any person skilled in the art can so apply them without difficulty.

Having thus described my invention, what I claim is—

1. The combination of two sets of tumblers, each set provided with a separate angle-bar or latch and both sets arranged on a common center, so as to be operated directly by one spindle.

2. The combination of the revolving disk E with two sets of tumblers mounted on the same shaft, substantially as specified.

3. The combination of a time lock or attachment, a non-time lock, and a spindle provided with one or more tumblers, arranged to operate upon said time-lock by suitable connections and disconnect the dogging device of the time-lock in case of the premature stoppage of the time-movement, or in case it shall be desired to open the safe or vault in advance of the time for which the time-lock had been previously set.

4. The combination, in a lock, of two or more sets of tumblers, both mounted on a common center, so as to be operated directly by one spindle, and each set provided with a separate angle-bar or latch, and a hook or dogging device, arranged to hold or dog the lock-bolt, the said parts being arranged to operate substantially as described, whereby the lock-bolt can be released from the dogging effect of the hook or device by means of one set of tumblers, and the lock itself can be controlled by the other set, substantially as and for the purpose set forth.

5. In combination with a time lock or attachment, a spindle provided with one or more tumblers suitably connected with and operating on said time lock or attachment, so as to control the same from the exterior by means of the spindle, substantially as and for the purposes set forth.

FRANKLIN McDUFFEE.

Witnesses:
JOHN McDUFFEE,
V. H. JOHNSON.